United States Patent [19]
Nelson

[11] 3,777,921
[45] Dec. 11, 1973

[54] CARRIERS ATTACHABLE TO AUTOMOBILES AND FOR USE IN CARRYING VEHICLES

[76] Inventor: Bernard J. Nelson, R.F.D. 1, Rockland, Maine 04841

[22] Filed: Feb. 24, 1971

[21] Appl. No.: 118,276

[52] U.S. Cl. ............................. 214/450, 214/85.1
[51] Int. Cl. ............................................. B60r 9/00
[58] Field of Search .................... 214/85.1, 450, 85; 224/42.1 F

[56] References Cited
UNITED STATES PATENTS
3,612,366  10/1971  Schneider .......................... 214/450
3,352,440  11/1967  Wilson ................................. 214/85
3,385,488  5/1968  Bronson .......................... 224/42.1 F Primary Examiner—Drayton E. Hoffman
Assistant Examiner—John Mannix
Attorney—Abbott Spear

[57] ABSTRACT

A carrier is disclosed that is attachable to automobiles of various types and includes a support having a ramp hingedly connected to its rear end and consisting of transversely hinged sections. The ramp may be unfolded for use in loading and unloading vehicles and folded into a substantially vertical position and then connected to the support to provide a barrier at the rear end thereof. The attachment of the carrier depends on the type of automobiles but the invention includes front and rear mounts. Desirably, both mounts are laterally adjustable and desirably the connection between the support and either or both mount is pivotable.

5 Claims, 13 Drawing Figures

PATENTED DEC 11 1973 3,777,921

INVENTOR
BERNARD G. NELSON

BY *Abbott Spear*
ATTORNEY

INVENTOR
BERNARD G. NELSON
BY
ATTORNEY

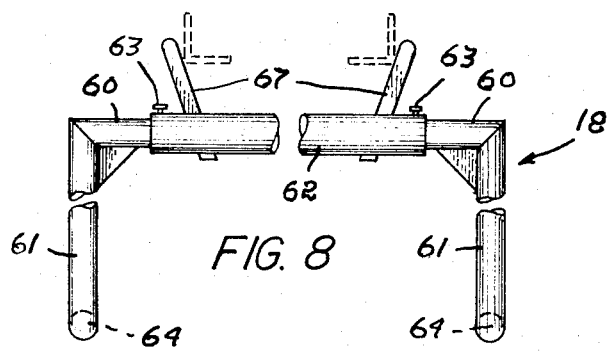
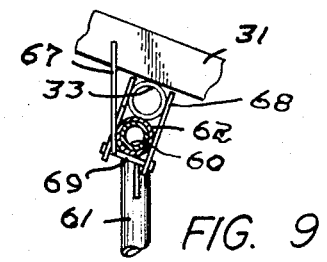
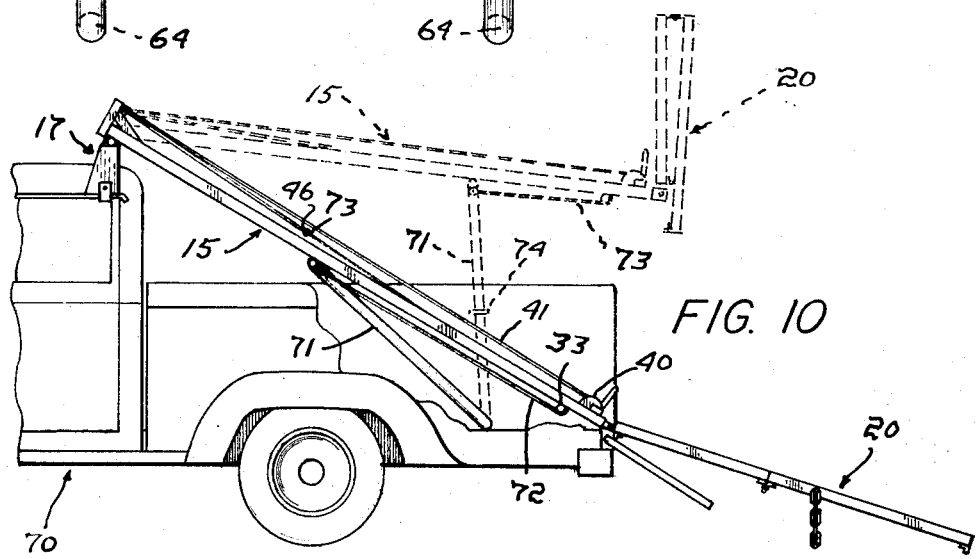
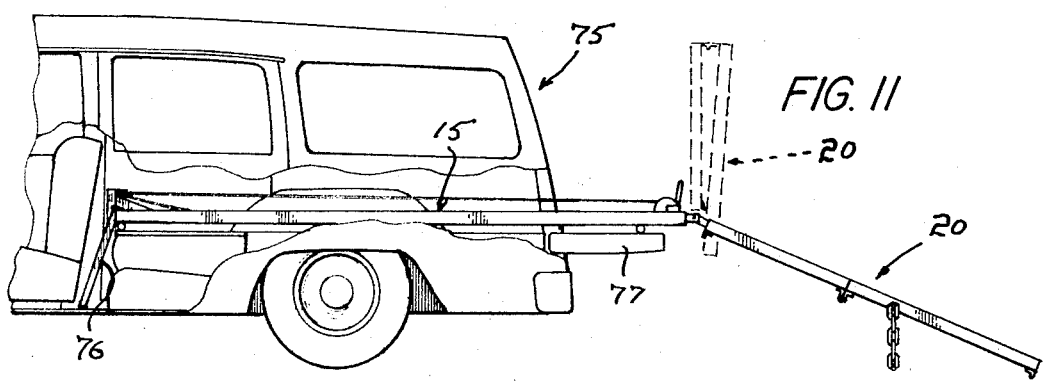
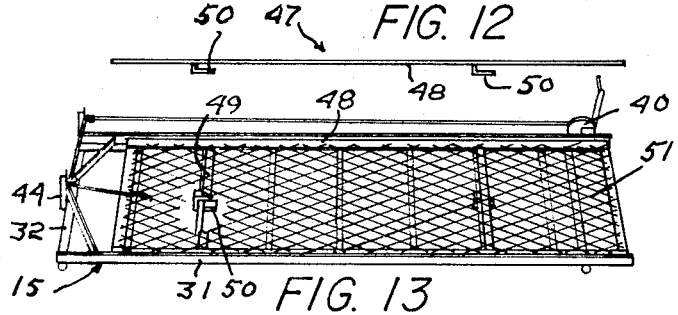
INVENTOR
BERNARD G. NELSON
BY
ATTORNEY

CARRIERS ATTACHABLE TO AUTOMOBILES AND FOR USE IN CARRYING VEHICLES

The present invention relates to carriers attachable to automobiles of different types and particularly adapted for use in transporting from place-to-place such vehicles as snowmobiles, garden tractors, snow blowers, and four wheeled lawn mowers.

Passenger automobiles have proved to be adaptable "work horses" and are widely used to haul trailers ranging from those that are small and easily handled to large "campers." Trailers have the objectionable features that, apart from their expense, they present parking and storage problems as well as requiring registration fees. They are difficult to maneuver. In addition, trailers are unsafe at high speeds and are otherwise a traffic problem. A wide range of "car top" carriers have been provided for attachment to passenger automobiles for carrying a wide range of articles including special purpose carriers for such heavy objects as boats, "campers" and skimobiles. See for example, U.S. Pat. Nos. 3,343,696, 3,527,371, and 3,209,770.

The widespread use of such vehicles as four wheeled lawn mowers, skimobiles, snow blowers, ad garden tractors has created problems. Among these is that confronting the seller in making delivery to the buyer and that of the purchaser in making use of such a vehicle at a distance from the place of its storage. At the present time, trailers are used in carrying such vehicles even with their above noted disadvantages.

The general objective of the present invention is to provide a carrier adapted for use with any such vehicles, an objective attained with a carrier attachable to an automobile, wheather a sedan, coupe, station wagon, or truck, and having a support and means for attaching the support to the automobile, in a rearwardly and downwardly inclined position when its front end may be supported by the roof of the automobile and its other end supported by the rear end thereof. The carrier includes a loading ramp hingedly connected to the rear end of the support end so that it may have a ground-engaging position and be swung upwardly therefrom. The carrier is provided with means to connect the ramp, when swung upwardly, to the vehicle support so that it becomes a barrier against rearward movement of the supported vehicle.

Another objective of the invention is to provide a ramp that, while sufficiently long to ensure easy loading and unloading does not extend upwardly to an objectionable extent when employed as a barrier, an objective attained by providing that the ramp includes hinged sections enabling it to be folded when not in use for loading or unloading carried objects or for supporting the rear end of the support in an elevated position.

Yet another objective of the invention is to provide front and rear mounts attached to the automobile that are laterally adjustable and another objective is to provide that the connections between the support and either or both mounts is pivotable.

In the accompanying drawings, there is shown an embodiment of the invention from which the above and other of its objectives, novel features, and advantages will be readily apparent.

In the drawings:

FIG. 8 is a fragmentary rear view of the rear mount;

FIG. 9 is a section taken approximately along the indicated lines 9—9 of FIG. 8;

FIG. 10 is a fragmentary side view of a pick-up type of truck with a carrier attached thereto and the truck body partly broken away;

FIG. 11 is a like view but with the vehicle of a station wagon type with the carrier attached thereto;

FIG. 12 is a side view of a deck attachable to the support when small wheeled vehicles are to be carried; and FIG. 13 is a perspective view showing the deck attached to the support.

A carrier in accordance with the invention consists of a vehicle support generally indicated at 15 and with an automobile such as that generally indicated at 16 in FIGS. 1 –4, secured thereto in a downwardly and rearwardly inclined position.

Figure 5:
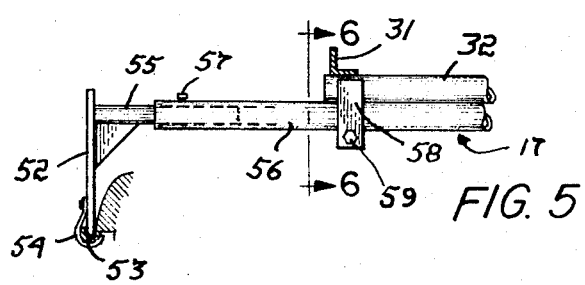
FIG. 5 is a fragmentary and partly sectioned view, on an increase in scale, taken substantially along the indicated lines 5—5 of FIG. 4.
Figure 6:
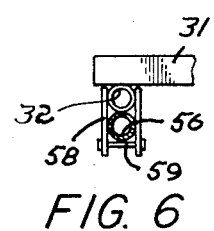
FIG. 6 is a section taken approximately along the indicated lines 6—6 of FIG. 5.
Figure 7:
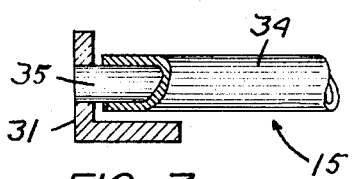
FIG. 7 is a fragmentary cross section of the vehicle support of the carrier.

The front end of the support 15 is detachably attached to a front mount generally indicated at 17 and detachably attached to the roof of the automobile 16. The front mount is best seen in FIGS. 5 and 6 and its preferred construction will subsequently be detailed. The rear end of the support 15 is detachably attached to a rear mount generally indicated at 18 shown as detachably connected to generally indicated adaptors 19 secured to the rear ends of the automobile frame. The rear mount 18 may best be seen in FIGS. 8 and 9 and will subsequently be detailed.

The carrier also includes a ramp generally indicated at 20 and consisting of two sections 21 and 22 interconnected by a hinge 23. The section 22 is connected to the support 15 by hinge means generally indicated at 24. The hinge 23 permits the ramp sections to be folded into their FIG. 1 relationship in which the ramp constitutes a barrier at the rear end of the support 15. When the ramp 20 is folded into its barrier-establishing position, it is connected to the support 15 as by chains 25 thereby to be held in that position until it is to be unfolded into the unloading and loading relationship of its sections illustrated by FIGS. 2 and 3. While the section 21 is longer than the ramp section 22, thus to minimize the height of the barrier, both are of the same construction so that a description of one will suffice. Each ramp consists, see FIGS. 1 and 2, of sides 26 interconnected by end members 27 providing a frame for supporting a sheet of stretch metal 28 which permits satisfactory rear vision with the carrier attached but unloaded. The sides and end members are shown as formed of angle irons of which, in the case of the sides 26, one flange is disposed upwardly. In the case of the end members 27, one flange is disposed downwardly. The section 22 is provided with stops 29 overlapping the ends of the sides 26 of the section 21 to prevent collapse of the ramp in its FIG. 2 position and also enabling it to function as a prop holding the rear end of the support 15, see FIG. 4, in such an elevated position as to permit the trunk cover 30 to be raised or the support removed in a manner later to be detailed.

The support 15 is shown, see FIGS. 2, 7, 8, and 13 as consisting of side members 31, angle irons, for example, interconnected at their front end by a transverse member 32, shown as a length of tubular stock. A like member 33 interconnects the rear ends of the side members 31. The side members 31 support a series of transverse load supporting members which are desirably tubular members or rollers 34 through which rods 35 freely extend with their ends held by the upwardly disposed flanges of the remote control members 31, see FIG. 7. The rollers 34 are of relatively small diameter and are spaced a substantial distance apart where a skimobile generally indicated at 36 is to be carried since its ski elements 37 and its treads 38 are of substantial length. This arrangement permits good rear visibility with the carrier attached but unloaded. The width of the support 15 is such that the ski elements 37 fit between.

Figure 1:
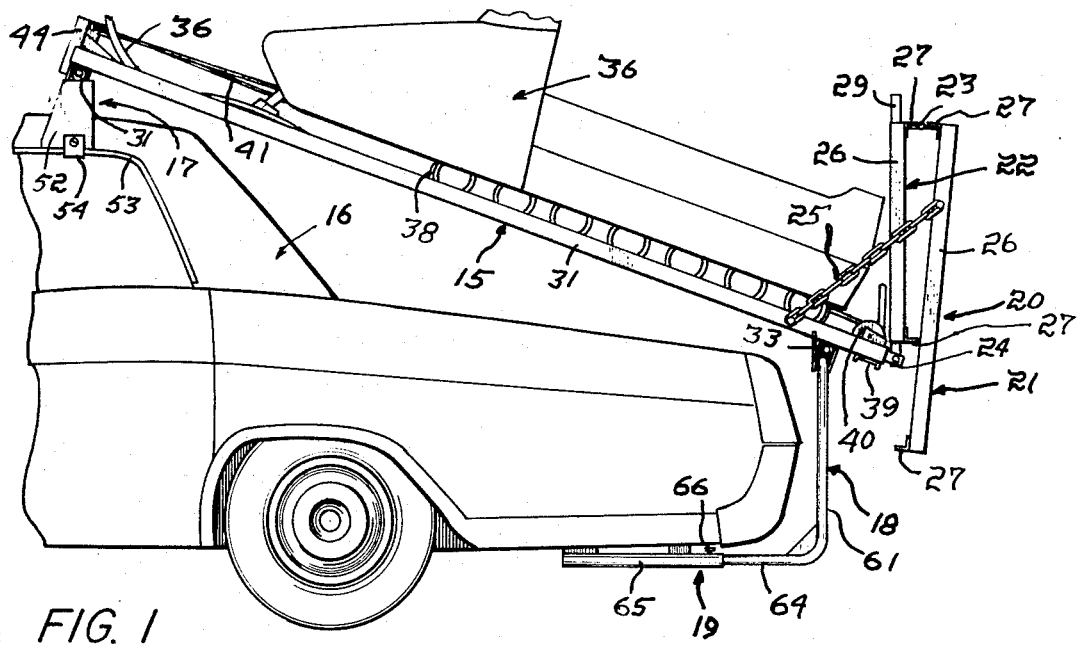
FIG. 1 is a side view of the carrier attached to an automobile and in its vehicle carrying position.
Figure 2:
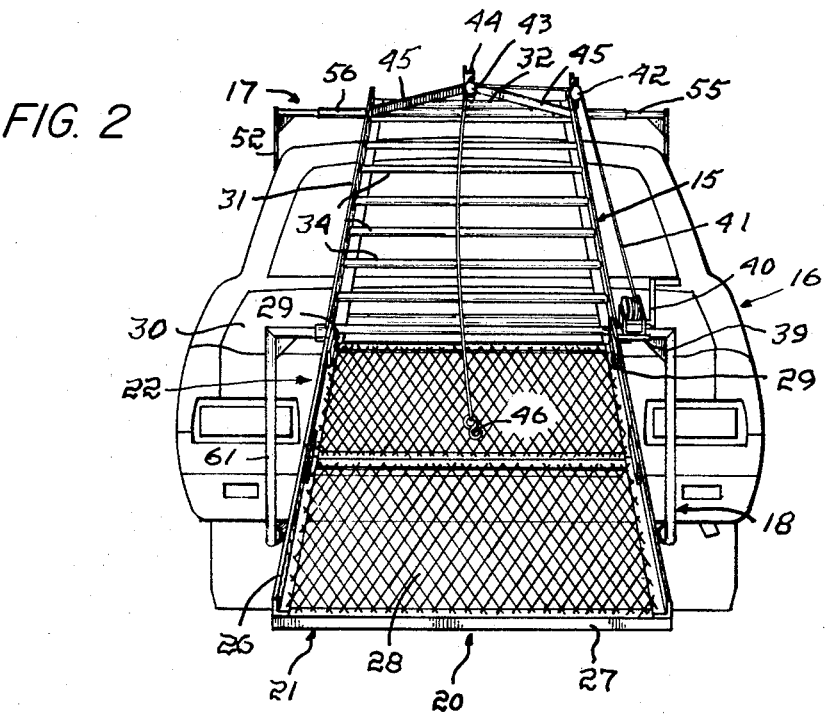
FIG. 2 is a view of the carrier, as seen from the rear of the automobile, with the ramp in its vehicle loading or unloading position.

An offset mount 39, near the rear end of one of the side members 31 and fastened thereto, supports a winch 40 with its cable 41 trained about a pulley 43, carried by a mount 44 on the transverse member 32 in a central position with its braces 45 anchored to the side members 31, see FIG. 2. The free end of the cable 41 is provided with a hook 46. The winch may be mounted on the front end of the support, particularly if it is of a remote control type.

Where wheeled vehicles such as small garden tractors, snow blowers, and four wheeled lawn mowers are to be carried the above described support cannot be used because of the distance between its rollers. It may, however, be readily converted to such uses by the addition of channels but preferably by the attachment of an all purpose deck generally indicated at 47, see FIGS. 12 and 13, thereto. The deck 47 is shown as comprising a frame 48 provided with cross braces 49 having depending hooks 50 disposed to be caught by appropriate ones of the rollers 34. A supporting surface is provided by a length of precut stretch metal 51 permitting satisfactory rear vision when the carrier is unloaded and the frame 48 is dimensioned to fit within the vertically disposed flanges of the side members 31 of the support 15.

Figure 3:
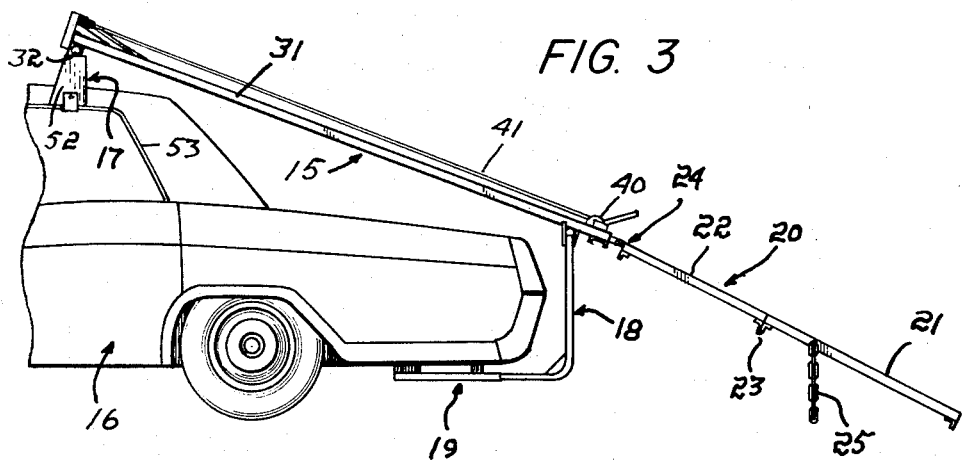
FIG. 3 is a side view of the carrier in its FIG. 2 position.

With the carrier as thus far described, and secured to the automobile 16, it will be apparent that in loading a skimobile 36 or any other object that can be carried by the rollers of the support 15, the operator first disconnects the chain 25 from the support 15 and unfolds the ramp 20 into its position shown in FIGS. 2 and 3. With the skimobile lined up with and close to the rear end of the ramp 20, the hook 46 may be attached to the front end of the skimobile. The winch 40 is then operated to draw the skimobile over the ramp 20 and along the support 15. The ramp 20 is then folded into its FIG. 1 position and the chains 25 reattached to secure the ramp as a barrier. It will be noted that the heavy end of the skimobile is thus as far forward as possible as is desirable with all heavy objects. From the foregoing it will also be obvious the manner in which the skimobile 36 is unloaded.

It is preferred that the mount 17 consists of a pair of end supports 52 dimensioned to fit the gutters 53 extending lengthwise of the roof of the automobile 16 with each support 52 provided with a hook 54 caught under the appropriate gutter. Each support 52 has a stub rod 55 slidably entrant of a central tubular member 56. The width of the mount 17 may thus be adjusted as required to fit an automobile. Set screws 57 are provided to lock the mount 17 in any extended or shortened relationship of its components. The front transverse member 32 of the support 15 has spaced keepers 58 which straddle the member 56 with their ends then detachably connected as by bolts 59. While the support 15 is thus detachably attached to the front mount 17, the interconnection is pivotable.

The preferred mount 18 is similar in that it is laterally adjustable and provides a connection with the support that is pivotable. See FIGS. 8 and 9. The mount 18 consists of a pair of end supports 60 provided with depending legs 61 and slidably entrant of a central tubular member 62 having set screws 63 engaged with the end supports 60 to lock the mount when its width has been so adjusted as to enable the forwardly disposed ends 64 of the legs 61 of the end supports 60 to be inserted into the elongated sockets 65 of the frame-supported adaptors 19. Set screws 66 are provided to lock the leg ends 64 in the sockets 65 and it will be appreciated that the sockets 65 are of substantial length enabling fore and aft adjustments of the mount 18. the tubular member 62 has arms 67 to ensure the centering of the support 15 and the rear transverse member 33 rests on the member 62 and has pairs of keepers 68 spaced to straddle the member 62 with their ends then detachably interconnected by bolts 69 to provide a pivotable connection between the members 62 and 33.

Figure 4:
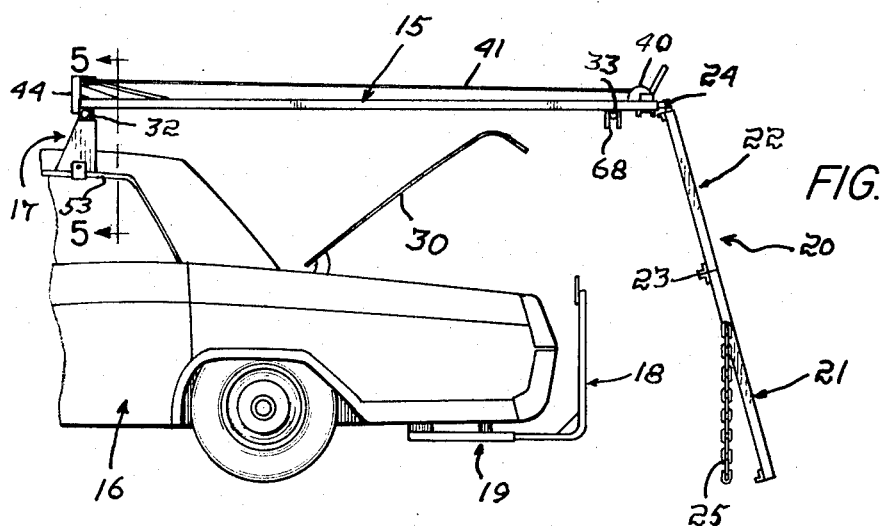
FIG. 4 is a side view of the carrier positioned to permit access to the trunk of the automobile to which it is attached.

The manner of disposing the ramp 20 to enable the trunk to be opened will be apparent from FIG. 4. It will also be apparent that, with the ramp 20 in its FIG. 4 position and with the front end of the carrier under an overhead support, not shown, the operator may connect the hook 46 of the cable 41 to the overhead support and by operating the winch 40 easily lift the carrier from the automobile with its mounts detached from the automobile or the support 15 by itself if detached from its mounts and may be as easily reattached when its use is again wanted.

A carrier in accordance with the invention may be used with other types of automobiles. For example, a truck generally indicated at 70 of the so called "pick-up" type, see FIG. 10, may have the front end of a support 15 secured to the roof of its cab in the manner previously described using a mount 17 and its rear end supported by the rear of the truck body in a position enabling the ramp 20 to be unfolded into its loading position. The trunk body has a U-shaped brace 71 pivotally secured to its sides and dimensioned to bridge another support 15 resting on the floor of the body and anchored to the front end thereof in any suitable manner, a hook, not shown, for example. The brace 71 is also dimensioned to straddle a skimobile loaded on such other support 15. The brace 71 has a cable 72 of sufficient length to enable it to be passed around the rear member 33 of the support 15 and forwardly so that its hook 73 may be connected to the hook 46 which may be detached from the snowmobile once the ramp 20 is in its barrier-establishing position. When thus connected, the brace 71 is approximately in its solid line position. When the winch 40 is operated, the brace 71 is swung upwardly raising the rear end of the loaded support 15 to an extent enabling another snowmobile to be loaded onto the subjacent support 15. The raised position of the brace 71 is shown in dotted lines in FIG. 10 and it will be noted that it is forwardly inclined. It may be secured in that position as by detachable stops 74.

Carriers in accordance with the invention may also be used with a station wagon 75, see FIG. 11. For such uses, neither mount is used and the front end of the support 15 is anchored in any suitable manner as by chains 76 connected to the anchors for the seat belts. The length of a support 15 is such that its rear protrudes from the rear end of the station wagon and is supported by its tailgate 77 with the ramp 20 disposed for use as previously described. Because of the height of a skimobile in the zone of its windshield, it must, in the case of a station wagon, be loaded therein, rear end first.

From the foregoing, it will be appreciated that carriers in accordance with the invention are of a simple, rugged construction and are easily installed and removed and otherwise well adapted to meet a wide range of requirements. While special mention has been made of the use of carriers in carrying snowmobiles, small tractors, snow blowers, and lawn mowers, other relatively heavy and bulky objects can be easily loaded and unloaded.

I claim:

1. A carrier for an automobile and for use in transporting such vehicles as four wheeled lawn mowers, snowmobiles, and garden tractors, said carrier comprising a support for such a vehicle, a ramp hingedly connected to the rear end of said support and including forward and rearward sections and a hinge connection therebetween, means carried by said support for attaching it to the automobile with said ramp located at the rear thereof so that it may be swung between substantially vertical and ground engaging positions, and means operable to detachably connect the second section of said ramp to said support when said ramp is in said substantially vertical position thereby to convert said ramp into a barrier, said hinge connection positioning the rearward section rearwardly of the forward section enabling the ramp to be unfolded into the vehicle supporting relationship of its sections by rearwardly pulling the rearward section in which the connecting means is between the second ramp section and the support.

2. The carrier of claim 1 in which the support includes a pair of laterally spaced marginal side members, a transverse member interconnecting the rails at each end of the support, and a plurality of transversely disposed and longitudinally spaced vehicle supporting rollers attached to and extending between said side members between said transverse members and the rollers are spaced apart to support the runners and tread members of a snowmobile, and a deck for wheeled vehicles, said deck dimensioned to fit between the side members of the support and including means for detachably securing it to said support.

3. The carrier of claim 1 in which the carrier attaching means includes a rearward connection comprising a first transverse member attachable to the rear of the automobile, a second transverse member at the rear end of the support supported by the first transverse member, means releasably interconnecting the transverse member, the first transverse member includes end portions and a central portion with which the second transverse member is in engagement, the end portions being slidably connected to the central portion to enable the first transverse member to be extended or shortened, a pair of sockets attachable to the rear of the automobile, and each end portion includes a leg detachably secured in an appropriate one of the sockets.

4. The carrier of claim 1 in which the rearward ramp section is longer than the forward section.

5. The carrier of claim 1 in which the carrier attaching means includes a rearward connection to which the rear end of the support is detachably attached, adaptors attachable to the frame of an automobile and including rearwardly disposed elongated sockets, and the rearward connection includes a pair of forwardly extending leg portions slidable in the sockets, and means to lock the leg portions therein.

* * * * *